(12) United States Patent
Heuts et al.

(10) Patent No.: US 8,013,081 B2
(45) Date of Patent: Sep. 6, 2011

(54) METHOD FOR PREPARING POLYMER PARTICLES

(75) Inventors: Martin Peter Joseph Heuts, North Wales, PA (US); Archie W. Garner, Ham Lake, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 576 days.

(21) Appl. No.: 12/083,995

(22) PCT Filed: Oct. 13, 2006

(86) PCT No.: PCT/US2006/040150
§ 371 (c)(1),
(2), (4) Date: Apr. 23, 2008

(87) PCT Pub. No.: WO2007/050326
PCT Pub. Date: May 3, 2007

(65) Prior Publication Data
US 2009/0156701 A1    Jun. 18, 2009

Related U.S. Application Data (60) Provisional application No. 60/730,623, filed on Oct. 27, 2005.

(51) Int. Cl.
*C08F 2/22* (2006.01)
*C08F 2/40* (2006.01)
*C08L 51/00* (2006.01)
*C08L 101/14* (2006.01)

(52) U.S. Cl. ............. 526/71; 526/201; 526/82; 526/87; 526/203; 524/460; 524/458; 523/201

(58) Field of Classification Search ................. 524/460, 524/458; 526/201, 71, 82, 87, 203; 523/201
See application file for complete search history.

(56) References Cited

U.S. PATENT DOCUMENTS

| | | | |
|---|---|---|---|
| 4,427,836 A | 1/1984 | Kowalski et al. | |
| 4,468,498 A | 8/1984 | Kowalski et al. | |
| 4,594,363 A | 6/1986 | Blankenship et al. | |
| 4,970,241 A | 11/1990 | Kowalski et al. | |
| 5,273,824 A | 12/1993 | Hoshino et al. | |
| 5,510,422 A | 4/1996 | Blankenship et al. | |
| 6,020,435 A | 2/2000 | Blankenship et al. | |
| 6,252,004 B1 | 6/2001 | Blankenship et al. | |
| 2004/0034147 A1* | 2/2004 | Zama | 524/460 |
| 2010/0063171 A1 | 3/2010 | Roschmann et al. | |

FOREIGN PATENT DOCUMENTS
WO    0068304 A1    11/2000

* cited by examiner

*Primary Examiner* — Kelechi C Egwim
(74) *Attorney, Agent, or Firm* — Brian R. Morrison; Westman, Champlin & Kelly, P.A.

(57) ABSTRACT

A polymer particle (10) useful for opacifying includes a polymer core (12) and a polymer sheath (16) surrounding the polymer core (12). The polymer core (12) is produced by polymerizing the polymer sheath (16) around the polymer core (12) in an emulsion. After at least a portion of the polymer core (12) is formed, a non-homopolymerizing monomer is added to the emulsion.

15 Claims, 2 Drawing Sheets

METHOD FOR PREPARING POLYMER PARTICLES

BACKGROUND OF THE INVENTION

The present invention relates generally to polymer particles. In particular, the present invention relates to emulsion polymerization processes for forming polymer particles useful for opacifying.

Polymer particles containing voids that impart favorable properties in compositions containing the polymer particles are known in the art. These polymer particles are useful as opacifying agents to supplement, or replace, pigmentary matter. The polymer particles may be used in various applications such as, for example, paints, coatings, inks, sunscreens, and paper manufacture.

Conventional methods for producing these polymer particles entail forming a base-swellable polymer core and encapsulating the polymer core in a polymer sheath. A base is typically added during formation of the polymer particle to swell the polymer core while the polymer sheath is being formed around the polymer core. Upon drying, the swollen polymer core shrinks and a void is created inside the polymer particle.

The polymer sheath is typically plasticized during formation of the polymer core to enhance swelling of the polymer core, which improves the opacifying characteristics of the polymer particle. Conventional methods for plasticizing the polymer sheath typically entail reducing the glass transition temperature of the polymer sheath by either adding solvents or increasing the concentration of free monomer. Solvent-induced plasticization may be disadvantageous, however, since the solvents are volatile organic compounds and, if not removed, permanently reduce the glass transition temperature of the polymer sheath.

Likewise, conventional methods for increasing the concentration of free monomer to plasticize the polymer sheath may also be disadvantageous. These conventional methods include increasing the concentration of free monomer by either increasing the rate of monomer addition or adding an inhibitor to inhibit the free-radical polymerization of the polymer sheath. Increasing the rate of monomer addition may be problematic since it causes increased polymerization and, thus, increased generation of heat, which may be difficult to control in large-scale production applications. Inhibiting free-radical polymerization using an inhibitor may also be problematic since it requires the additional steps of stopping polymerization of the polymer sheath and subsequently reinitiating polymerization, which results the in use of excessive amounts of initiator.

BRIEF SUMMARY OF THE INVENTION

The present invention is a method for preparing emulsion polymer particles useful for opacifying. The method includes emulsion polymerizing a polymer sheath around a swellable polymer core and adding a non-homopolymerizing monomer while swelling the polymer core.

While the above-identified drawing figures set forth an embodiment of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

The present invention includes polymer particles useful for opacifying purposes and a method for forming the polymer particles. The method involves using a non-homopolymerizing monomer to enhance the opacifying characteristics of the polymer particle.

Figure 1:
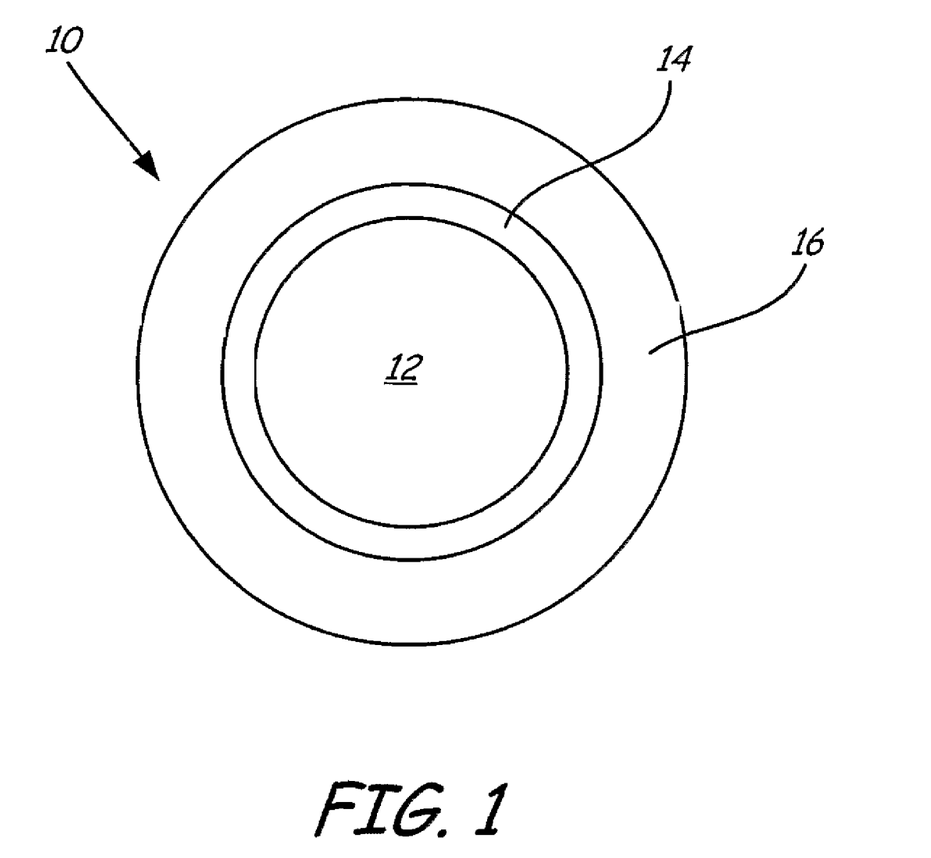
FIG. 1 is a schematic illustration of a polymer particle produced by a method of the present invention.

FIG. 1 shows a schematic diagram of opacifying polymer particle 10 produced by a method of the present invention. While not wishing to be bound by theory, the structure of polymer particle 10 is believed to be representative of the structure of the polymer particle produced by some embodiments of the present invention. Polymer particle 10 includes polymer core 12, optional intermediate layer 14, and polymer sheath 16. Polymer sheath 16 forms the outermost portion of polymer particle 10, with optional intermediate layer 14 located between polymer core 12 and polymer sheath 16. Polymer core 12 is a swellable polymer core that is formed from a composition that swells when exposed to a swelling agent. Polymer core 12 may be composed of one or more stages and may include one or more polymer seeds (not shown). In an exemplary embodiment, polymer core 12 is formed from a base-swellable composition and polymer sheath 16 is formed from a base non-swellable composition (i.e., a composition that does not substantially swell in the presence of a base).

Polymer particle 10 includes a single intermediate layer 14, as shown in FIG. 1. Polymer particle 10 can include any number of intermediate layers 14. When present, intermediate layer(s) 14 partially or fully encapsulate polymer core 12 and are, in turn, partially or fully encapsulated by polymer sheath 16. In some embodiments, intermediate layer(s) 14 are tie-coats that enhance the formation of polymer sheath 16 around polymer particle 10. In some embodiments, polymer core 12, intermediate layer(s) 14, and/or polymer sheath 16 are distinct features separated from each other by distinct interfaces or boundaries, as shown in FIG. 1. In other embodiments, these features are somewhat intermixed and are not separated from each other by distinct interfaces or boundaries.

The proportions of the various stages of polymer particle 10 may vary relative to one another on a weight basis. Examples of suitable weight ratios for polymer core 12 relative to intermediate layer(s) 14 range for about 1:0.5 to about 1:10, with particularly suitable weight ratios ranging from about 1:1 to 1:7. Examples of suitable weight ratios for polymer core 12 relative to polymer sheath 16 range from about 1:5 to about 1:20. In an exemplary embodiment, polymer particle 10 includes about 5 parts of polymer core material (i.e., material included in polymer core 12), about 14 parts of intermediate layer material (i.e., material included in intermediate layer(s) 14), and about 86 parts of polymer sheath material (i.e., material included in polymer sheath 16).

FIG. 1 shows polymer particle 10 after being completely formed, but prior to being dried. While not wishing to be bound by theory, it is believed that, upon drying, polymer core 12 dehydrates and its overall volume decreases. This reduction in volume is believed to cause voids (not shown in FIG.

1) or other structural features to develop within polymer particle 10 that affect the transmission of light through polymer particle 10. When sufficient amounts of polymer particle 10 are included in compositions (e.g., such as films) that are allowed to dry, these structural features help increase the opacity of the composition (or otherwise supplement or replace pigmentary matter in the composition).

Figure 2:
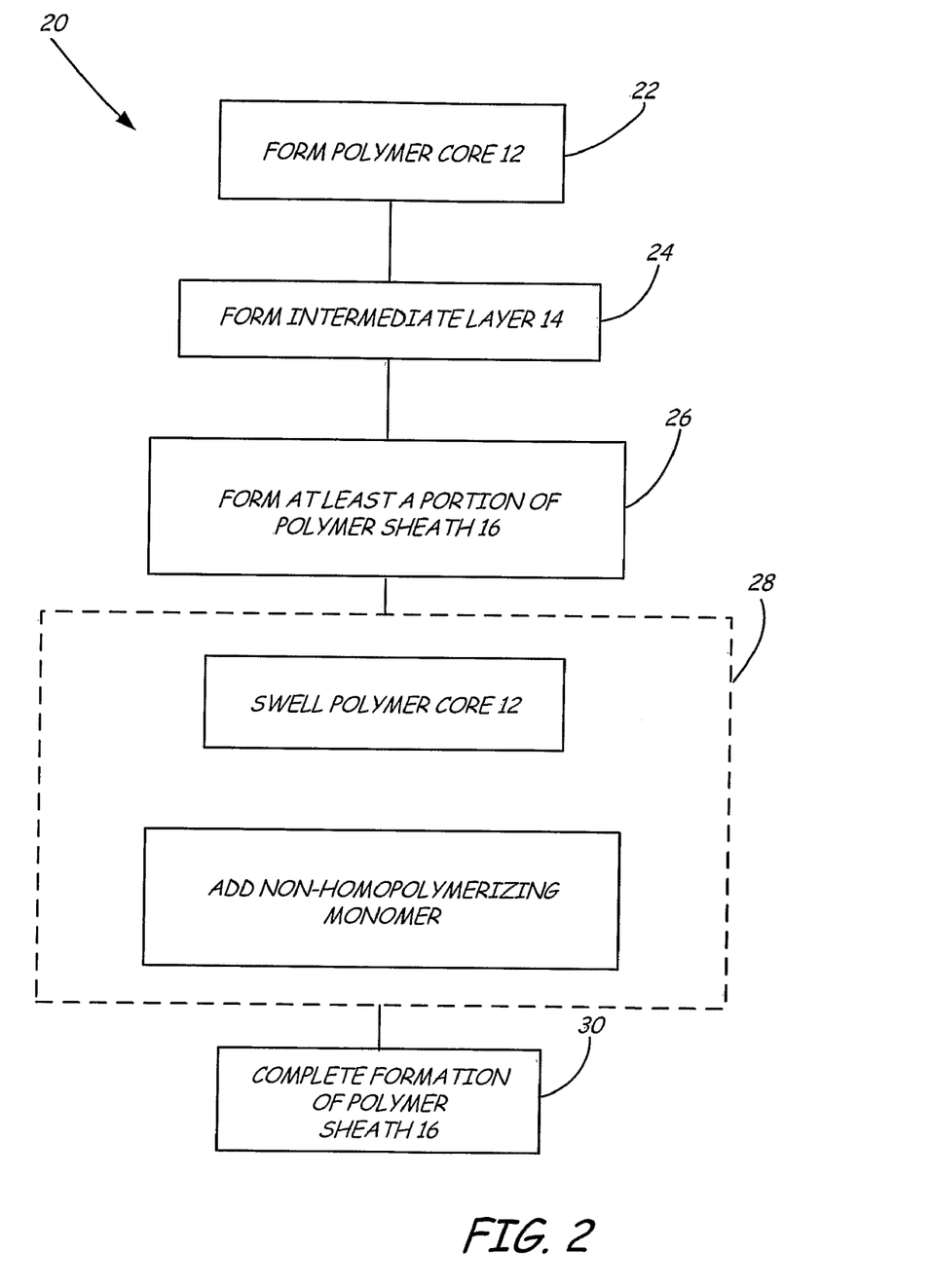
FIG. 2 is a flow diagram illustrating a method of the present invention for producing the polymer particle of FIG. 1.

FIG. 2 is a block diagram of method 20, which is an exemplary method of forming polymer particle 10 pursuant to the present invention. All of the steps included in method 20 are performed in an emulsion. The term "emulsion" as used herein refers to a liquid system including one or more substances dispersed (e.g., in droplets, micelles, or any type of suspension phase) in an immiscible dispersion medium.

As shown in FIG. 2, method 20 entails first forming polymer core 12 (step 22). One or more intermediate layers 14 are then optionally formed around polymer core 12 (step 24) via emulsion polymerization. Formation of polymer sheath 16 via emulsion polymerization is then initiated (step 26). After forming at least a portion of polymer sheath 16 around intermediate layer 14 (and thus around polymer core 12), a swelling agent is added to the emulsion containing the nascent polymer particle 10 to swell polymer core 12 (step 28). In addition, an amount of non-homopolymerizing monomer is added to the emulsion (step 28).

The swelling agent and the non-homopolymerizing monomer may be added either sequentially (in either order) or at substantially the same time. In an exemplary embodiment, the swelling agent and non-homopolymerizing monomer are added after polymer sheath 16 has been formed to an extent sufficient to encapsulate intermediate layer 14 and polymer core 12. The swelling (or expansion) of polymer core 12 may involve partial merging of the outer periphery of polymer core 12 into portions of the inner periphery of intermediate layer (s) 14 and/or polymer sheath 16 and also partial enlargement or bulging of intermediate layer(s) 14 and/or polymer sheath 16.

While not wishing to be bound by theory, the presence of a sufficient amount of non-homopolymerizing monomer in the emulsion is believed to enhance swelling of polymer core 12 by plasticizing polymer sheath 16 to allow polymer sheath 16 to expand outward in response to pressure exerted on it by polymer core 12. This plasticization may be accomplished by adding an amount of non-homopolymerizing monomer to the emulsion (step 28) that may be sufficient to increase the concentration of free monomer in the emulsion by an amount that reduces the glass transition temperature of polymer sheath 16. The reduction in the glass transition temperature may affect the plasticity of polymer sheath 16. In an exemplary embodiment, the glass transition temperature is reduced to less than about a polymerization temperature of polymer sheath 16.

The term "concentration of free monomer", "free monomer", and variations thereof are defined to include monomer that is present in any phase of the emulsion and capable of affecting the glass transition temperature of polymer sheath 16. The terms include a monomer that has not polymerized with any other monomer, as well as a monomer present in an oligomer including less than about 10 total monomers. The terms do not include a monomer that has already been polymerized into any structural feature of the polymer particle (e.g., polymer core 12, intermediate layer(s) 14, and polymer sheath 16).

As used herein, the term "non-homopolymerizing monomer" refers to monomers that do not readily homopolymerize (i.e., monomers that do not readily polymerize with each other) under conditions present in an emulsion free-radical polymerization. Examples of preferred non-homopolymerizing monomers include monomers that homopolymerize under standard conditions at a rate less than about 10%, preferably less than about 5%, and more preferably less than about 1% of the rate that styrene homopolymerizes under standard conditions. In some embodiments, the non-homopolymerizing monomers may be included in an oligomer (e.g., at a terminal end of the oligomer or any other location of the oligomer) that is introduced into the emulsion to increase a concentration of free monomer in the emulsion.

The formation of polymer sheath 16 is completed (step 30) after allowing polymer core 12 to expand for a sufficient period of time. To accomplish this, the concentration of free monomer in the emulsion is decreased to substantially fix the structure of polymer sheath 16 and help prevent further swelling of polymer sheath 16. This reduction in the concentration of free monomer may also help prevent polymer sheath 16 from shrinking when polymer particle 10 is dried. In an exemplary embodiment, the concentration of free monomer is reduced by introducing monomer into the emulsion that is capable of polymerizing with the non-homopolymerizing monomer and incorporating the non-homopolymerizing monomer present in the pool of free monomer into polymer sheath 16. This reduces the concentration of free monomer and may strengthen polymer sheath 16. In an exemplary embodiment, less than about 0.5 weight percent, and preferably less than about 0.1 weight percent of the non-homopolymerizing monomer remains as residual free monomer in the emulsion, based on the total weight of non-homopolymerizing monomer added to the emulsion.

Polymer particles 10 may, when dried, cause enhanced opacity in compositions containing polymer particles 10 when compared to compositions containing opacifying polymer particles prepared by conventional methods. This enhanced opacifying effect may be attributable to the formation of larger voids due to enhanced swelling of polymer core 12 during formation of polymer particle 10.

The timing of the addition of non-homopolymerizing monomer to the emulsion containing nascent polymer particle 10 may vary. The non-homopolymerizing monomer may suitably be added to the emulsion after about 5 weight percent, preferably after about 10 weight percent, and more preferably after about 15 weight percent of the total weight of monomer to be incorporated into polymer sheath 16 has been added to the emulsion. In some embodiments, the non-homopolymerizing monomer may be added to the emulsion before less than about 80 weight percent, preferably before less than about 50 weight percent, and more preferably before less than about 30 weight percent of the total weight of monomer to be incorporated into polymer sheath 16 has been added to the emulsion. In an exemplary embodiment, the non-homopolymerizing monomer is added to the emulsion after between about 15 weight percent and about 30 weight percent of the total weight of monomer to be incorporated into polymer sheath has been added to the emulsion.

The addition profile of the non-homopolymerizing monomer to the emulsion may vary. In some embodiments, the non-homopolymerizing monomer may be added to the emulsion in the form of a burst charge after at least a portion of polymer sheath 16 has been formed around polymer particle 10. As used herein the term "burst" refers to an addition of a substantial amount of material to the emulsion over a relatively short period of time. For example, in one embodiment, substantially all of the non-homopolymerizing monomer is added to the emulsion in a single burst. In other embodiments, the non-homopolymerizing monomer is fed into the emulsion over a period of time.

The total amount of non-homopolymerizing monomer added to the emulsion, after at least a portion of polymer sheath 16 has been formed, may be any amount sufficient to affect swelling of polymer sheath 16. In some embodiments, at least about 1 part, preferably at least about 2 parts, and more preferably at least about 3 parts of non-homopolymerizing monomer are added to the emulsion per 100 total parts of monomer added to the emulsion for inclusion in polymer sheath 16. In some embodiments, less than about 20 parts, preferably less than about 15 parts, and more preferably less than about 10 parts of non-homopolymerizing monomer are added to the emulsion per 100 total parts of monomer added to the emulsion for inclusion in polymer sheath 16. In an exemplary embodiment, about 5.0 parts of non-homopolymerizing monomer are added to the emulsion per 100 total parts of monomer added to the emulsion for inclusion in polymer sheath 16.

A delay may be included between the addition of the non-homopolymerizing monomer and the reduction of the free monomer concentration. The delay may function to temporarily interrupt polymerization of polymer sheath 16 at a time in which polymer sheath 16 exhibits enhanced expandability to maximize swelling of polymer sheath 16. The duration and/or nature of this delay may vary depending upon the particular system being produced. The delay may include one or more time components. For example, one time component may correspond to a time between adding the non-homopolymerizing monomer and retarding polymerization of polymer sheath 16 and another time component may correspond to a time between adding a second monomer capable of copolymerizing with the non-homopolymerizing monomer and the reduction of free monomer concentration. In an exemplary embodiment, a delay of about 5 minutes is included between the addition of the non-homopolymerizing monomer and the addition of a second monomer capable of copolymerizing with the non-homopolymerizing monomer and incorporating the non-homopolymerizing monomer into polymer sheath 16.

Examples of suitable non-homopolymerizing monomers include monomers having the following chemical structure:

and anhydrides thereof, wherein each X moiety may independently be hydrogen, halogen, or an organic group. At least two X moieties are selected from $R^1$, $COOR^2$, and Ar, wherein $R^1$ is an organic group; $R^2$ is hydrogen, halogen, or an organic group (preferably a $C_1$-$C_{10}$ alkyl group); and Ar is a phenyl group of the chemical formula $C_6(R^3)_5$, where $R^3$ is independently hydrogen, a halogen, or an organic group and two $R^3$ groups can join to form a ring optionally containing one or more heteroatoms. Examples of particularly suitable non-homopolymerizing monomers having the above chemical formula include maleic anhydride or related monomers and monomers having the following chemical structures: $C(Ar)(R^1)=CH_2$ (e.g., such as alpha-methylstyrene, trans-beta-methylstyrene, and alpha-ethylstyrene); $R^1O(O)C-CH=CH-C(O)OR^2$ (e.g., diethyl fumarate and diethyl maleate); Ar—CH=CH—Ar (e.g., cis or trans stilbene); and combinations and variations thereof; where Ar, $R^1$, $R^2$, $R^3$ are defined above.

Methods and compositions for forming polymer core 12 via emulsion polymerization are well known in the art. See, for example, U.S. Pat. Nos. 4,427,836, 5,494,971, 5,639,805, 6,020,435, and 6,252,004. Polymer core 12 may include one or more substances with acid functional groups to promote swelling of polymer core 12 upon exposure to a base. Examples of suitable concentrations of these acid-group-containing substances in polymer core 12 include concentrations of at least less than about 5% by weight, preferably at least about 10% by weight, more preferably at least about 20% by weight, and most preferably at least about 25% by weight, based on the total weight of polymer core 12. Additional examples of suitable concentrations of these acid-group-containing substances in polymer core 12 include concentrations of less than about 100% by weight, preferably less than about 80% by weight, more preferably less than about 60% by weight, and most preferably less than about 50% by weight, based on the total weight of polymer core 12.

Examples of suitable acid-group-containing substances include both monoethylenically and polyethylenically unsaturated monomers that include acid functional groups, non-polymeric substances that include acid functional groups, and combinations thereof. As used herein, the term "ethylenically unsaturated" refers to monomers that include at least one carbon-carbon double bond. Examples of suitable ethylenically-unsaturated monomers having acid functional groups include acrylic acid, methacrylic acid, acryloxypropionic acid, (meth)acryloxypropionic acid, itaconic acid, aconitic acid, maleic acid or anhydride, fumaric acid, crotonic acid, monomethyl/maleate, monomethyl fumarate, monomethyl itaconate, any other suitable ethylenically unsaturated monomer having acid functional groups, and combinations thereof. Examples of suitable nonpolymeric compounds that contain at least one acid functional group include $C_6$-$C_{12}$ aliphatic or aromatic monocarboxylic acids and dicarboxylic acids such as benzoic acid, m-toluic acid, p-chlorobenzoic acid, o-acetoxybenzoic acid, azelaic acid, sebacic acid, octanoic acid, cyclohexanecarboxylic acid, lauric acid, monobutyl phthalate and the like, and combinations thereof.

In some embodiments, polymer core 12 may be an acid-swellable polymer core that contains one or more cationic substances that swell in the presence of acids such as, for example, formic acid. In such embodiments, polymer core 12 may not include one or more substances with acid functional groups.

The composition of polymer core 12 may include nonionic ethylenically unsaturated monomers in addition to the base-swellable or acid-swellable substances discussed above. The nonionic ethylenically unsaturated monomers may be either monoethylenically or polyethylenically unsaturated monomers. Examples of suitable nonionic monoethylenically unsaturated monomers include styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$-$C_{20}$) alkyl or ($C_3$-$C_{20}$) alkenyl esters of (meth)acrylic acid (e.g., such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like), and combinations thereof. Examples of suitable concentrations of the nonionic ethylenically unsaturated monomers in polymer core 12 range from about 0% by weight to about 95% by weight, based on the total weight polymer core 12.

Polymer core 12 may be formed using any suitable emulsion polymerization process known in the art and may be of any suitable size. Examples of suitable average unswollen core sizes for polymer core 12 include diameters of at least about 50 nanometers (nm), preferably at least about 75 nm, and more preferably at least about 100 nm. Additional examples of suitable average unswollen core sizes for polymer core 12 include diameters of less than about 1,000 nm, preferably less than about 700 nm, and more preferably less than about 200 nm.

In some embodiments, polymer core 12 is obtained by polymerizing monomers around one or more polymer seeds. The polymer seeds may be of any suitable average particle size. Examples of suitable average particle sizes for the polymer seeds include average particle sizes of at least about 30 nm in diameter, preferably at least about 80 nm in diameter, and more preferably at least about 150 nm in diameter. Additional examples of suitable average particle sizes for the polymer seeds include average particle sizes of less than about 500 nm in diameter, preferably less than about 300 nm in diameter, and more preferably less than about 250 nm in diameter.

Intermediate layer(s) 14 are prepared by conducting an emulsion polymerization in the presence of polymer core 12. The composition of intermediate layer(s) 14 may contain at least one monoethylenically unsaturated monomer that includes an acid functional group and/or a nonionic monoethylenically unsaturated monomer. Both the monoethylenically unsaturated monomers having acid functional groups and the nonionic monoethylenically unsaturated monomers discussed above for forming polymer core 12 are also useful for making intermediate layer(s) 14.

Polymer sheath 16 of the present invention is formed by emulsion polymerizing one or more types of monomer around either polymer core 12 or the outermost intermediate layer 14. In most embodiments, polymer core 12 is exposed to a supply (or pool) of free monomers substantially capable of homopolymerizing, and monomer is free-radical polymerized around polymer particle 10 to form polymer sheath 16. After at least a portion of polymer sheath 16 has been formed, the composition of the free monomer supply is altered to include an amount of non-homopolymerizing monomer sufficient to enhance swelling of polymer sheath 16. As discussed above, while not wishing to be bound by theory, the non-homopolymerizing monomer is thought to decrease the glass transition temperature of polymer sheath 16 and plasticize polymer sheath 16. After a period of time sufficient to increase the plasticity of polymer sheath 16, a charge of monomer substantially capable of homopolymerizing and/or copolymerizing with the non-homopolymerizing monomer is added to the emulsion to react with polymer sheath 16 and complete the formation of polymer sheath 16.

Polymer sheath 16 may include a concentration of at least one nonionic monoethylenically unsaturated monomer that is preferably at least about 80 weight percent and more preferably at least about 90 weight percent, based on the total monomer weight of polymer sheath 16. The nonionic monoethylenically unsaturated monomers suitable for use in forming polymer core 12 are also suitable for polymer sheath 16, with styrene being a particularly suitable example of a nonionic monoethylenically unsaturated monomers for incorporation in polymer sheath 16. In some embodiments, polymer sheath 16 may also contain, as polymerized units, Up to about 20 weight percent, and more suitably up to about 10 weight percent of one or more monoethylenically unsaturated monomers containing acid-functionality, based on the total weight of polymer sheath 16. Examples of suitable monoethylenically unsaturated monomers containing acid-functionality include acrylic acid, methacrylic acid, acryloxypropionic acid, (meth)acryloxypropionic acid, itaconic acid, aconitic acid, maleic acid, maleic anhydride, fumaric acid, crotonic acid, monomethyl maleate, monomethyl fumarate, monomethyl itaconate, and any of these in any combination.

Suitable swelling agents include bases that are capable of migrating through the partially formed polymer sheath and swelling the core. Examples of suitable swelling agents include bases such as ammonia; ammonium hydroxide; volatile lower aliphatic amines such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like; any other suitable swelling agents known in the art; and combinations thereof.

Polymer core 12, when base-swellable, tends to swell when subjected to a base that migrates through polymer sheath 16 and at least partially neutralizes the acid functional groups of polymer core 12. This neutralization results in swelling of polymer core 12 by hydration. In some embodiments, an amount of base is added to the emulsion that is sufficient to increase the pH of polymer core 12 to a pH of at least between about 6 and about 10.

A water-soluble free radical initiator is used during the emulsion polymerization process to facilitate polymerization of polymer core 12, intermediate layer(s) 14, and/or polymer sheath 16. Suitable water-soluble free radical initiators include hydrogen peroxide; tert-butyl peroxide; alkali metal persulfates such as sodium, potassium and lithium persulfate; ammonium persulfate; combination of any of these; and mixtures of such initiators with a reducing agent. Examples of suitable reducing agents include sulfites such as alkali metal metabisulfite, hydrosulfite, and hyposulfite; sodium formaldehyde sulfoxylate; and reducing sugars such as ascorbic acid and isoascorbic acid. The type and amount of initiator may be the same or different in the various stages of the multi-stage polymerization. In an exemplary embodiment, suitable concentrations of initiator in the emulsion range from between about 0.1% by weight to about 2.0% by weight, based on the total weight of monomer added to the emulsion.

One or more nonionic or anionic emulsifiers, or surfactants, may be used, either alone or together in the method of the present invention. Examples of suitable nonionic emulsifiers include tert-octylphenoxyethylpoly-ethoxyethanol, dodecyloxypoly ethoxyethanol, nonylphenoxyethyl-polyethoxyethanol, polyethylene glycol monooleate, ethoxylated castor oil, fluorinated alkyl esters and alkoxylates, polyoxyethylene sorbitan monolaurate, sucrose monococoate, di(2-butyl)phenoxypolyethoxyethanol, hydroxyethylcellulosepolybutyl acrylate graft copolymer, dimethyl silicone polyalkylene oxide graft copolymer, poly(ethylene oxide) poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene lauramide, N-lauryl-N-polyoxyethyleneamine and polyethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcosinate, sodium 1-alkoxy-2-hydroxypropyl sulfonate, sodium alpha-olefin sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly ethoxyethyl sulfate. See, for example, U.S. Pat. No. 6,252,004. The one or more emulsifiers or surfactants can be added prior to the addition of any monomer charge, during the addition of a monomer charge, or a combination thereof.

Examples of suitable concentrations of the emulsifiers and/or surfactants in the emulsion range from about 0.01% by weight to about 2.0% by weight, based on the total weight of monomer in the emulsion.

EXAMPLES

The present invention is more particularly described in the following example that is intended as an illustration only, since numerous modifications and variations within the scope of the present invention will be apparent to those skilled in the art. Unless otherwise noted, all parts, percentages, and ratios reported in the following examples are on a weight basis, all reagents used in the examples were obtained, or are available, from commercial chemical suppliers or may be synthesized by conventional techniques.

Example 1

Formation of Polymer Particle 10

Example 1, described in detail below, illustrates one embodiment of the present invention for preparing polymer particle 10 using a non-homopolymerizing monomer.

1.1: Polymer Seed Formation

An emulsion containing polymer seeds for use in preparing polymer core 12 was prepared as follows. 475.2 parts deionized water ("DI water") were added to a reactor equipped with a nitrogen blanket, an agitator, and a condenser. The DI water was heated to a temperature between about 75° C. and about 77° C. Then 4.7 parts ammonium decylphenoxy-poly(ethyleneoxy) sulfate (the Alipal CO-436 product commercially available from GAF Corporation) were added. 118.7 parts DI water, 11.0 parts ammonium decylphenoxy-poly(ethyleneoxy) sulfate, 359.3 parts methyl methacrylate, and 4.7 parts methacrylic acid were added to a clean monomer vessel and mixed for 30 minutes. The resulting mixture was visually inspected to ensure that an emulsion had formed.

About 5.00% of the emulsion from the monomer vessel was then added to the reactor. A premix of 10 parts DI water and 1.8 parts ammonium persulfate was added to the emulsion in the reactor at a temperature of between about 75° C. and about 77° C. The temperature of the emulsion in the reactor was allowed to rise to between about 82° C. and about 85° C. About 7 minutes after adding the premix, the emulsion in the monomer vessel was fed into the reactor via an addition line at a feed rate sufficient to deliver all of the emulsion to the reactor after about 2 hours. After all of the emulsion in the monomer vessel was fed into the reactor, the addition line was rinsed with 10 parts DI water and the emulsion in the reactor was held for 30 minutes. The emulsion in the reactor was then cooled to 38° C., the pH was adjusted to between about 7.5 and about 8.0 with up to about 1.5 parts aqueous ammonia (29 weight percent NH$_3$). 1.5 parts 1,2-Benzisothiazolin-3-one (8.5%) (the Nuosept 485 product commercially available from International Specialty Products) and 1.5 parts DI water were added to the emulsion.

The above process resulted in the formation of polymer seeds. The average size of these polymer seeds was determined to be between about 58 and about 65 nm. The solids content in the emulsion containing the polymer seeds was determined to be about 37.5 percent.

1.2: Formation of Polymer Core 12

Polymer cores 12 were prepared as follows. 729.5 parts DI water were added to a reactor equipped with a nitrogen blanket, agitator, and condenser and the DI water was heated to 80° C. 573.8 parts DI water, 9.5 parts ammonium decylphenoxy-poly(ethyleneoxy) sulfate, 358.2 parts methylmethacrylate, 192.9 parts methacrylic acid, and 8.3 parts dodecylmercaptan were added to a clean monomer vessel and agitated for 30 minutes. The resulting mixture was then visually inspected to ensure that an emulsion had formed. A premix of 2.76 parts of the free-radical initiator ammonium persulfate and 20 parts DI water was then added to the DI water in the reactor followed by 85.0 parts of the core seed emulsion of Section 1.1.

The emulsion in the monomer vessel was then fed into the reactor at a feed rate of about 4 parts per minute to initiate free-radical polymerization of polymer core 12 around the polymer seeds. After three minutes, the feed rate was increased to about 10 parts per minute. The temperature of the emulsion inside the reactor rose to about 85° C. After all of the emulsion from the monomer vessel was fed into the reactor, the feed line between the monomer vessel and the reactor was rinsed with 20 parts DI water. The temperature of the emulsion within the reactor was held constant for about thirty minutes and then allowed to cool.

The above process resulted in the formation of polymer cores 12 in the emulsion that had an average particle size of about 166 nm.

1.3: Formation of Intermediate Layer 14 and Polymer Sheath 16

Polymer sheaths 16 were formed on the polymer cores 12 of Section 1.2 using the following process. 1,054.2 parts DI water and 97.4 parts of the polymer core 12 containing emulsion of Section 1.2 were added to a reactor equipped with a nitrogen blanket, agitator, and condenser and heated to about 75° C. A first monomer mixture was prepared by combining 8.2 parts butyl methacrylate, 72 parts methylmethacrylate, and 1.6 parts methacrylic in a first clean monomer vessel and agitating the mixture for 5 minutes. A second monomer mixture was prepared by combining 190 parts DI water, 6.0 parts ammonium decylphenoxy-poly(ethyleneoxy) sulfate, 1.8 parts ammonium persulfate, 472.4 parts styrene and 10.1 parts allyl methacrylate in a second clean monomer vessel and agitating the mixture for 30 minutes. The first and second monomer mixtures were visually inspected to ensure that emulsions had formed.

A premix of 1.2 parts ammonium persulfate and 30 DI water was added to the reactor to induce the formation of free radicals. To form a tie-coat (i.e., intermediate layer 14) around polymer core 12, the first monomer mixture was fed into the reactor at a feed rate of 9 parts per minute. After all of the first monomer mixture had been fed into the reactor, the second monomer mixture was fed into the reactor at a feed rate of 9 parts per minute to initiate the formation of polymer sheath 16 around the tie-coat.

After about 20% of the second monomer mixture had been added, the feed was stopped and 15 parts of the swelling agent aqueous ammonia (29 weight percent NH$_3$) were added to the reactor to swell polymer core 12. 20.1 parts of the non-homopolymerizing monomer alpha-methyl styrene were then added to enhance swelling of polymer sheath 16. After the feed had been stopped for 5 minutes, the remainder of the second monomer mixture was fed into the reactor at a feed rate of 9 parts per minute to complete the formation of polymer sheath 16. The batch temperature rose to 89.5° C. The feed line was rinsed with 20 parts DI water and the emulsion in the reactor was held at 80° C. for three hours and then cooled.

The residual monomer concentrations of styrene and alpha-methyl styrene in the emulsion in the reactor was assayed. Thirty minutes after the last of the second monomer mixture was fed into the reactor, the concentration of residual styrene monomer in the reactor was determined to be about 0.21% styrene. Residual amounts of alpha-methyl styrene monomer were not detected in the emulsion. Two hours after completing the feed of the second monomer mixture, the concentration of residual styrene monomer in the emulsion was determined to be about 0.05% styrene.

Comparative Example A

Formation of Polymer Particles Without Using Non-Homopolymerizing Monomer

Conventional polymer particles were prepared using the procedure described above, with the following procedural deviations. The polymer sheath was prepared in the absence of alpha-methyl styrene. Instead, 492.5 parts styrene (as opposed to 472.4 parts styrene—see Section 1.3 of Example 1) were included in the second monomer mixture. In addition, after addition of all of the second monomer mixture into the reactor, the batch temperature within the reactor rose to 83.5° C. (as opposed to 89.5° C.—see Section 1.3 of Example 1).

The residual monomer concentration of styrene in the resulting emulsion containing the conventional polymer particles was assayed. Thirty minutes after completing the feed of the second monomer mixture into the reactor, the concentration of residual styrene monomer in the emulsion in the reactor was determined to be about 0.30% styrene. Two hours after completing the feed of the second monomer mixture into the reactor, the concentration of residual styrene monomer in the emulsion in the reactor was determined to be about 0.09% styrene. As such, the amounts of residual styrene remaining in the emulsion after thirty minutes and after two hours were similar for both Example 1 and Comparative Example A.

Opacifying Effects of the Polymer Particles of Example 1 and Comparative Example A The contrast ratios of films formed from compositions including the polymer particles of Example 1 and Comparative Example A were determined to compare the opacifying effects of the two types of polymer particles. A sample of each of Example 1 and Comparative Example A were prepared for contrast analysis. The samples were taken from the reactors 30 minutes after all of the styrene had been added. That is, the samples were taken from the emulsions in the reactors 30 minutes after the last of the second monomer mixtures had been fed into the reactors (see Section 1.3 of Example 1).

The samples were prepared by adding 2.0 grams of the emulsion of either Example 1 or Comparative Example A to 21.78 grams of a vinyl acetate-ethylene copolymer emulsion (the Airflex EF811 product commercially available from Air Products) while mixing. Each sample was mixed for three minutes. A drawdown of each sample was made using a Doctor Blade Film Applicator (0.003 inch Bird-type bar) manually on a black-and-white chart (commercially available from the Leneta Company). The charts were held flat by a vacuum plate while making the drawdowns. The samples were dried in a 40° C. oven on a smooth surface such as a glass plate for 10 minutes.

The reflectance of the film of each sample on the black and white chart was determined using a spectrophotometer from Applied Color Systems.

The contrast ratio was calculated using the following formula:

$$\text{Contrast ratio} = R_b/R_w \times 100,$$

where $R_b$ is the reflectance of the sample film over the black portion of the chart and $R_w$ is the reflectance of the sample film over the white portion of the chart. The contrast ratio of the film containing the polymer particles of Example 1 was determined to be 18.7 and the contrast ratio of the film containing the polymer particles of Comparative Example A was determined to be 14.9. These results indicate that film containing the polymer particles of Example 1 exhibited a greater total opacity than the film containing the polymer particles of Comparative Example A. As such, the polymer particles of Example 1 exhibited increased opacifying characteristics when compared to the conventional polymer particles of Comparative Example A.

Thus, as described above, the method of the present invention provides a process for producing a polymer particle for opacifying purposes that includes a swellable polymer core, one or more optional intermediate layers, and a polymer sheath covering the polymer core. A non-homopolymerizing monomer is added while forming the polymer particle to enhance the opacifying effects of the polymer particle. Unlike conventional methods, the method of the present invention allows the polymer sheath to be formed without using inhibitors or solvents.

Although the present invention has been described with reference to preferred embodiments, workers skilled in the art will recognize that changes may be made in form and detail without departing from the spirit and scope of the invention.

The invention claimed is:

1. A method for preparing emulsion polymer particles useful for opacifying, the method comprising:
   polymerizing a first portion of a polymer sheath around a swellable polymer core in an emulsion;
   treating the polymer core with a swelling agent to swell the polymer core;
   adding non-homopolymerizing monomers to the emulsion containing the polymer core to retard or interrupt the polymerization of the polymer sheath;
   after adding the non-homopolymerizing monomers, adding free monomers to the emulsion that are capable of copolymerizing with the non-homopolymerizing monomers; and
   polymerizing the added free monomers and the non-homopolymerizing monomers to form a second portion of the polymer sheath.

2. The method of claim 1, wherein the non-homopolymerizing monomers comprise a substance of the formula:

and anhydrides thereof;
wherein:
X are moieties independently selected from hydrogen, a halogen, or an organic group; and
at least two X moieties are selected independently from $R^1$, $COOR^2$, and Ar, wherein:
$R^1$ is an organic group;
$R^2$ is hydrogen, a halogen, or an organic group; and Ar is a phenyl group of the chemical formula $C_6(R^3)_5$ and $R^3$ are independently hydrogen, a halogen, or an organic group.

3. The method of claim 1, wherein the non-homopolymerizing monomers comprise:
   maleic anhydride;
   non-homopolymerizing monomers of the formula $C(Ar)(R^1)=CH_2$;
   non-homopolymerizing monomers of the formula $R^1O(O)C-CH=CH-C(O)OR^2$;
   non-homopolymerizing monomers of the formula Ar—CH=CH—AR;
   combination thereof; or
   anhydrides thereof;
   wherein Ar is a phenylu group of the chemical formula $C_6(R^3)_5$ and $R^1$, $R^2$ and $R^3$ are hydrogen, a halogen, or an organic group.

4. The method of claim 1, wherein the non-homopolymerizing monomers added to the emulsion constitute at least about 3 parts by weight per 100 parts by weight of monomers used to polymerize the polymer sheath.

5. The method of claim 4, wherein adding the non-homopolymerizing monomers to the emulsion comprises adding the non-homopolymerizing monomers to the emulsion in a burst charge.

6. The method of claim 1, wherein adding the non-homopolymerizing monomers to emulsion reduces a glass transition temperature of the first portion of the polymer sheath to less than about a polymerization temperature of the first portion of the polymer sheath.

7. The method of claim 1, wherein, upon drying, the polymer particles include voids that cause opacity in compositions containing the polymer particles.

8. The method of claim 1, wherein the non-homopolymerizing monomers comprise alpha-methyl styrene.

9. The method of claim 1, wherein the swelling agent comprises a base and the polymer core comprises a base-swellable polymer core.

10. The method of claim 9, wherein the base and the non-homopolymerizing monomers are added at substantially the same time.

11. The method of claim 1, wherein the emulsion is substantially free of inhibitors that inhibit free-radical polymerization of the polymer sheath at some stage.

12. The method of claim 1, wherein polymerizing the polymer sheath around the swellable polymer core comprises free-radical polymerizing the polymer sheath around the polymer core.

13. A method for preparing emulsion opacifying polymer particles, the method comprising:
   emulsion polymerizing a polymer core;
   exposing the polymer core to a supply of free monomers to polymerize a first portion of a polymer sheath around the polymer core;
   after polymerizing the first portion of the polymer sheath, exposing the polymer core to an amount of a swelling agent sufficient to swell the polymer core;
   adding non-homopolymerizing monomers to retard or interrupt the polymerization of the first portion of the polymer sheath; and then
   polymerizing additional free monomers and the non-homopolymerizing monomers into a second portion of the polymer sheath.

14. The method of claim 13, wherein the non-homopolymerizing monomers added in the burst charge constitute at least about 3 parts by weight per 100 parts by weight of monomers used to form the polymer sheath.

15. The method of claim 14, wherein exposing the polymer core to the amount of the swelling agent and changing the composition of the supply of free monomer are performed at substantially the same time.

* * * * *

UNITED STATES PATENT AND TRADEMARK OFFICE
CERTIFICATE OF CORRECTION

PATENT NO. : 8,013,081 B2
APPLICATION NO. : 12/083995
DATED : September 6, 2011
INVENTOR(S) : Heuts et al.

Page 1 of 1

It is certified that error appears in the above-identified patent and that said Letters Patent is hereby corrected as shown below:

On the Title page:

Item [56] References Cited insert:

--OTHER PUBLICATIONS
International Search Report and Written Opinion of PCT/US06/40150--

In the Claims:

Column 13, Claim 3:

Line 12, delete "Ar-CH=CH-AR" and insert --Ar-CH=CH-Ar--

Signed and Sealed this
Seventeenth Day of December, 2013

Margaret A. Focarino
*Commissioner for Patents of the United States Patent and Trademark Office*